United States Patent [19]

Minegishi et al.

[11] Patent Number: 5,302,326
[45] Date of Patent: Apr. 12, 1994

[54] MANUFACTURING METHOD OF URETHANE FOAM MOLDED PRODUCTS

[75] Inventors: Takeshi Minegishi; Masayuki Kubo; Ryosuke Nozaki, all of Yokohama; Masahiko Ogawa, Takasaki; Masaki Tanaka, Annaka; Yukio Morimoto, Tokyo, all of Japan

[73] Assignees: NHK Spring Co., Ltd., Yokohama; Shin-Etsu Chemical Co., Ltd., Tokyo, both of Japan

[21] Appl. No.: 885,319

[22] Filed: May 18, 1992

[30] Foreign Application Priority Data

May 20, 1991 [JP] Japan .................... 3-115040

[51] Int. Cl.$^5$ .................... B29C 67/22; B28B 7/36
[52] U.S. Cl. .................... 264/22; 264/51; 264/338
[58] Field of Search .................... 264/51, 22, 25, 338

[56] References Cited

U.S. PATENT DOCUMENTS

| | | | |
|---|---|---|---|
| 3,713,851 | 1/1973 | Cekada et al. | 264/338 |
| 3,983,265 | 9/1976 | Letoffe | 427/58 |
| 4,220,727 | 9/1980 | Godlewski | 521/110 |
| 4,244,912 | 1/1981 | Battice | 264/338 |
| 4,558,147 | 12/1985 | Eckberg et al. | 556/427 |
| 4,681,714 | 7/1987 | Lopes et al. | 264/300 |
| 4,702,874 | 10/1987 | Ohara et al. | 264/338 |
| 4,761,443 | 8/1988 | Lopes | 264/338 |
| 4,769,204 | 9/1988 | Oba et al. | 264/300 |
| 4,772,515 | 9/1988 | Hara et al. | 428/447 |
| 5,035,849 | 7/1991 | Uemura et al. | 264/338 |
| 5,036,117 | 7/1991 | Chung et al. | 264/331.11 |

FOREIGN PATENT DOCUMENTS 0125114 11/1984 European Pat. Off. .
0294043 12/1988 European Pat. Off. .
2450680 10/1980 France .

OTHER PUBLICATIONS

Patent Abstracts of Japan, vol. 12, No. 10 (M-658)(2857), Jan. 1988 of JP-A-62 173 220, (Ashi Chem. Ind. Co., Ltd.), Jul. 1987.

Primary Examiner—Allan R. Kuhns
Attorney, Agent, or Firm—Frishauf, Holtz, Goodman & Woodward

[57] ABSTRACT

In manufacturing molded product of urethane foam, a releasing agent mainly composed of organopolysiloxane is applied on the inner surface of the mold maintained at 60° C. The agent is prepared by dissolving the base composed of organopolysiloxane composition in an organic solvent. The organopolysiloxane composition comprises (a) a first organopolysiloxane of which 0.1 to 5.0% of all organic groups bonded with Si atoms are vinyl groups and at least 80% of the remaining organic groups are methyl groups, and (b) a second organopolysiloxane containing at least three Si bonded hydrogen atoms in one molecule, wherein the first and second organopolysiloxanes contain Si vinyl groups and SiH groups at a ratio in a range of 1:0.5 to 1:5, and do not substantially contain unreactive siloxane. The agent is cured by irradiation with ultraviolet rays, and a thin and uniform film of releasing agent is formed on the inner surface of the mold. Inside the mold coated with this film of releasing agent is injected a raw liquid of urethane foam of cold cure-type, and after the curing step, a molded product of urethane foam in a desired shape is manufactured.

13 Claims, 1 Drawing Sheet

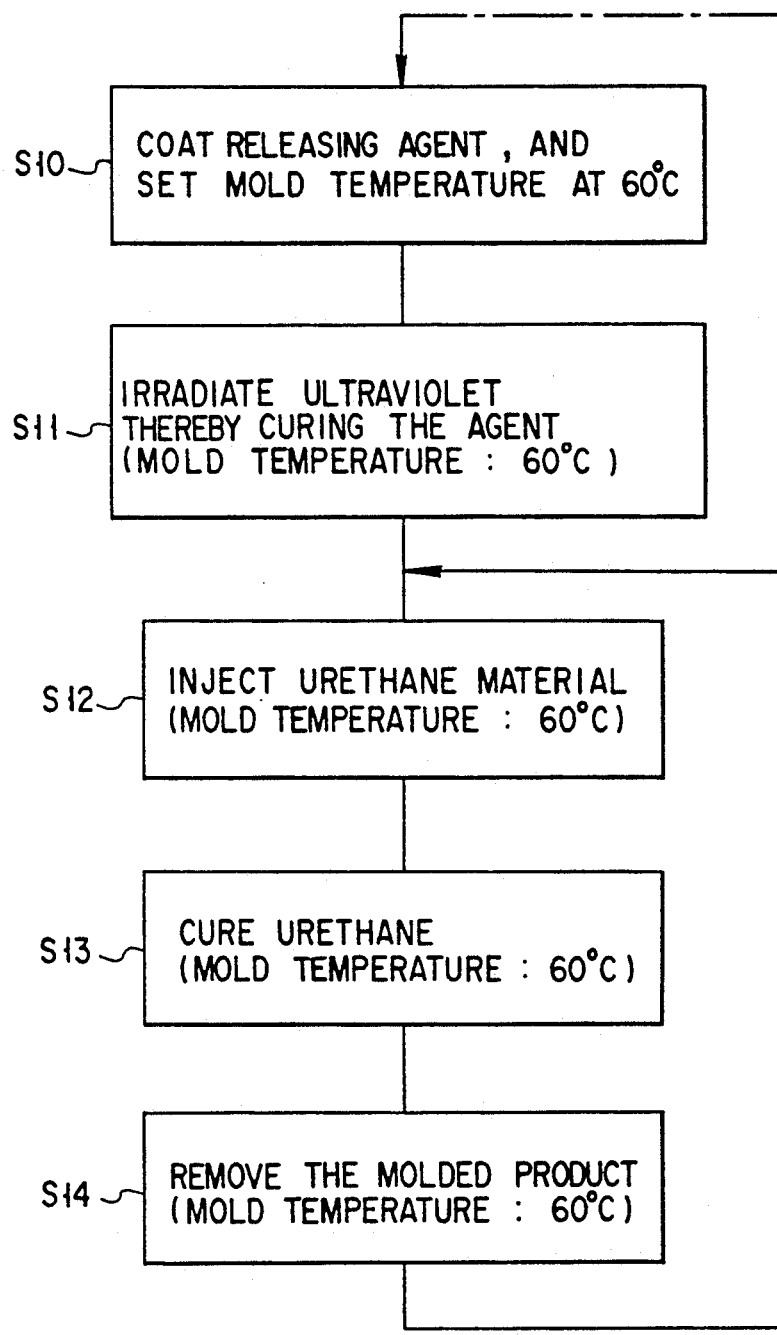
F I G. 1

MANUFACTURING METHOD OF URETHANE FOAM MOLDED PRODUCTS

BACKGROUND OF THE INVENTION

1. Field of the Invention

The present invention relates to a manufacturing method of urethane foam molded products used, for example, on vehicle seat cushions, furniture, beds and other cushions, and more particularly to a manufacturing method of urethane foam molded products suitable for manufacturing molded products of cold cure-type urethane foams.

2. Description of the Related Art

Molded products of urethane foam used in automobile seats or the like are formed in a desired shape by injecting the raw liquid of urethane foam into a mold kept at a specific temperature, foaming and curing.

Hitherto, in manufacturing molded products of cold cure-type urethane foam cured around 60° C., wax such as polyethylene was used as a releasing agent. As compared with hot cure-type urethane form cured around 100° C., the cold cure-type urethane foam is low in its treating temperature, and therefore migration of releasing agent onto the surface of the urethane foam molded product is less, even in the case of wax with a relatively low melting point.

In the conventional wax in paste form, however, when urethane foam is molded, the surface of the agent on the internal surface of the mold is disturbed. When the agent is repeatedly applied on the mold, therefore, much wax is unevenly accumulated on the internal surface of the mold, and the asperities of the agent on the mold internal surface become significant. When manufactured by using such mold, the surface of the molded product of the urethane foam becomes very poor.

Besides, the releasing agent migrates, although very slightly, onto the surface of the molded product of urethane foam. Even a slight amount may cause induction of an unusual noise depending on the application of the urethane foam molded product. For example, in the case of the urethane foam molded product used in an automobile seat cushion when the urethane foam molded product is contacted with a metallic frame, if the agent is left over on the molded product, an unusual noise may be caused when the molded product rubs against the metallic frame.

To solve this problem, it has been proposed to use organopolysiloxane (hereinafter called also silicone) as a releasing agent. The silicone agent is, like the conventional releasing agent, applied on the internal surface of the mold, and cured, and the urethane foam raw liquid is injected into the mold, foamed and cured.

Generally, the silicone agent hardly migrates onto the surface of the urethane foam molded product, and when the application of releasing agent is repeated, the agent is likely to accumulate on the internal surface of the mold. Accordingly, all silicone releasing agents are not always suited to the manufacture of urethane foam molded products. For example, practical prior art processes are disclosed in the U.S. Pat. Nos. 4,244,912, 4,681,714, 4,769,204, and 4,220,727.

If a silicone releasing agent which cannot be applied uniformly on the internal surface of the mold is used, the thickness of the agent on the internal surface of the mold is uneven or a part of the agent may be locally separated from the internal surface of the mold. Therefore, every time the application of releasing agent is repeated, the agent is accumulated unevenly on the internal surface of the mold, and asperities exceeding the allowable limit may be produced shortly on the internal surface of the mold.

Still more, since the treating temperature of cold cure-type urethane foam is as low as around 60° C., in the conventional silicone releasing agent, the curing was very slow and it was not suited to practical use. If the urethane foam is molded, while a part of the releasing agent is stuck uncured on the internal surface of the mold, the surface of the molded product of urethane foam is very rough, and the value as a product is lost.

SUMMARY OF THE INVENTION

It is hence a primary object of the invention to provide a manufacturing method to produce urethane foam molded products capable of applying a releasing agent uniformly and thinly on the internal surface of the mold, capable of keeping the state of the releasing agent excellent inside the mold, avoiding migration of the agent to the urethane foam molded product, and curing the agent in a short time, even if the treating temperature is low, as in a cold cure-type urethane foam.

The invention developed to achieve the above object relates to a manufacturing method for producing urethane foam molded products by applying a releasing agent on the internal surface of a mold for molding the urethane foam, curing the agent, injecting the raw liquid of urethane foam in the mold, foaming and molding, in which the agent is mainly composed of organopolysiloxane.

The organopolysiloxane composition used in the agent is a mixture of (a) a first organopolysiloxane of which 0.1 to 5.0% of all organic groups bonded with Si atoms are vinyl groups, and at least 80% of the remaining organic groups are methyl groups, and (b) a second organopolysiloxane containing at least three Si bonded hydrogen atoms are contained in one molecule, wherein organopolysiloxanes of (a) and (b) have the ratio of Si vinyl group and SiH group defined in a range of 1:0.5 to 1:5, and do not substantially contain nonreactive siloxane. If other organopolysiloxanes are used, the specified object of the invention is not achieved. Based on a content of the organopolysiloxane of (a) being 100 parts by weight, the ratio by weight of organopolysiloxane (b) should be 0.3 to 10 parts by weight, or preferably 0.5 to 5 parts by weight.

This agent contains a platinum compound, which is a reaction catalyst of Si vinyl group and SiH group, and this agent is diluted, as required, in a proper amount of organic solvent. Or, if necessary, a sensitizer may be added to promote curing by ultraviolet rays, or a lanthanum rare earth compound may be added as an additive. The agent is applied on the interior surface of the mold, and is cured by irradiation of ultraviolet rays.

As a reaction regulator, moreover, it is desired to add acetylene alcohol, such as 2-methyl-3-butyn-2-ol, 1-ethynyl-1-cyclohexanol, and 3, 5-dimethyl-1-hexyn-3-ol. The content may be properly adjusted.

As the organic solvent, for example, toluene, xylene, trichloroethylene, naphtha or their mixture may be used. As the platinum compound, for example, platinum chloride acid such as platinum (I) chloride acid and platinum (II) chloride acid, or various catalysts containing platinum chloride acid may be used. The content of the platinum compound may be a catalytically effective amount, and about 5 to 1000 ppm by weight is added. As the sensitizer, any material capable of promoting curing by absorbing ultraviolet rays may be used, and, for example, ketone and quinone compounds, such as 4, 4'-dimethoxybenzophenone and other benzophenone compounds, anthrone compound, and beryllium salts may be used.

The lanthanum rare earth metal compound as an additive may be at least one compound selected from the group consisting of serium oxide, neodymium oxide, samarium oxide, other oxides, hydroxides, basic carbonates, and oxides and hydroxides possessing SiOM (M being a lanthanum rare earth metal) bond. A particularly preferable compound is serium oxide.

The agent sprayed on the internal surface of the mold by means of an atomizer or the like forms a thin and uniform film on the mold surface, and when irradiated with ultraviolet rays, it is cured and fixed on the inner surface of the mold. Later a raw liquid of urethane foam is injected inside the mold. The mold is regulated to a temperature suited to curing of urethane foam.

Since the agent is cured by ultraviolet rays, it can be used without any problem even if the treating temperature is relatively low around 60° C. as in a cold cure-type urethane foam. Moreover, after the agent is cured, it is not melted at relatively high temperature as in a hot cure-type urethane foam, and migration onto molded product surface of urethane foam is hardly observed. This agent forms a very thin and uniform thickness film, and if applied several times, an uneven thickness is not substantially formed on the inner surface of the mold.

According to the invention, without being affected by the mold temperature, the releasing agent can be applied very thinly on the inner surface of the mold, and is cured in a uniform thickness. Since the agent does not substantially migrate onto the surface of the molded product of the urethane foam, the agent will not cause noise in the urethane foam product. By accumulation of the releasing agent, the surface asperities inside the mold are so small as to be negligible, and therefore asperities are not transferred practically on the surface of the molded product of urethane foam when molded by using such mold.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWING

The accompanying drawing, which is incorporated in and constitutes a part of the specification, illustrates presently preferred embodiments of the invention and, together with the general description given above and the detailed description of the preferred embodiments given below, serves to explain the principles of the invention.

FIG. 1 is a schematic diagram showing an example of a manufacturing method of a molded product of a cold cure-type urethane foam according to an embodiment of the invention.

DETAILED DESCRIPTION OF THE PREFERRED EMBODIMENTS

An embodiment of the invention is described in detail below. FIG. 1 shows an example of a manufacturing process of a cold cure-type urethane foam molded product. This embodiment comprises step 10 for applying a releasing agent on the mold, step 11 for irradiating the agent with ultraviolet rays, step 12 for injecting a raw liquid of urethane foam into the mold to foam, step 13 for curing the urethane foam, and step 14 for removing the urethane foam molded product from the mold. In the embodiment, a series of steps from the urethane foam injecting step 12 to the product removing step 14 is called a urethane foam molding cycle. The mold is an aluminum cast mold for an automobile seat cushion.

Examples of materials of urethane raw liquid are given below.

| Description | Parts by weight | Material manufacture |
| --- | --- | --- |
| EP-3033 (polyol) | 80.0 | Mitsui Toatsu Chemicals Inc. |
| POP-3128 (polyol) | 20.0 | Mitsui Toatsu Chemicals Inc. |
| Water | 2.4 | |
| Dabco33LV ® (catalyst) | 0.1 | Sankyo Air Products Co., Ltd. |
| DabcoXDM ® (catalyst) | 0.3 | Sankyo Air Products Co., Ltd. |
| Diethanolamine (crosslinking agent) | 1.0 | Mitsui Toatsu Chemicals Inc. |
| L-5305 (foam former) | 1.0 | Nippon Unicar Co., Ltd. |
| TDI-80/20 (isocyanate) | INDEX 100 | Mitsui Toatsu Chemicals Inc. |

In the agent applying step 10, the silicone releasing agent in the following composition is sprayed on the inner surface of the mold for molding urethane foam.

The agent is composed of base A and organic solvent B blended at a rate of A:B=5:95, and the ingredients of the base A are as shown in (a) to (d) below. The organic solvent B is a dry solvent of a naphtha compound (Nippon Oil Co., Ltd.).

(a) 100 parts by weight of dimethylpolysiloxane with a degree of polymerization of 150 and a viscosity of 400 cs (at 25° C.), having both ends terminated with dimethylvinylsiloxy groups (b) 2 parts by weight of methylpolysiloxane with a polymerization degree of 40 and a viscosity of 25 cs (at 25° C.), having both ends terminated with trimethylsiloxy groups (c) 4 parts by weight of complex of platinum and vinyl siloxane (platinum content 0.5%)

(d) 0.25 parts by weight of ethynylcyclohexanol as regulator for inhibiting gel formation The agent is applied, by using a sprayer, on the inner surface of the mold by 600 g per mold. The agent is excellent in the applicability by a sprayer, and can be applied very thinly and uniformly on the inner surface of the mold.

The agent is cured in the ultraviolet irradiation step 11 as being irradiated with ultraviolet rays in a wavelength range of 250 to 400 nm, for example, by means of an ultraviolet ray lamp. The irradiation intensity of the ultraviolet ray lamp is 145 mW/cm$^2$.

Or, by raising the mold temperature to around 100° C., the curing of the agent may be further promoted. In such a case, it is necessary to cool the mold to a temperature suited to a cold cure type urethane foam in a mold colding step.

After the agent is cured, in the urethane raw liquid injecting step 12, the raw liquid of urethane foam is injected into the mold, and in the curing step 13 the urethane foam is cured for 6 minutes, thereby producing a molded product of the urethane foam in a desired shape. The molded product of the urethane foam is removed from the mold in the product removing step 14. The mold temperature is maintained about 60° C. (60° C.±5° C.) from the agent applying step 10 till the product removing step 14. The agent remains within the mold without substantially migrating onto the surface of molded product of urethane foam.

When manufacturing second and subsequent molded products of urethane foam by using the same mold, by repeating the urethane foam molding cycle (steps 12 to 14) plural times without passing through the agent applying step 10 and ultraviolet ray irradiating step 11, a plurality of urethane foam molded products may be manufactured. In the case of the releasing agent described herein, 40 molded products of urethane foam could be manufactured by one application.

After repeating the urethane foam molding cycle by a specified number of times, by passing through the agent applying step 10 and ultraviolet ray irradiating step 11 again, the film of the agent is regenerated inside the mold, and the urethane foam molding cycle (steps 12 to 14) may be repeated again by the specified number of times.

Incidentally, the releasing effect may be recovered by executing the releasing agent applying step 10 and ultraviolet ray irradiating step 11 after every session of the urethane foam molding cycle.

The releasing agent may be similarly applied when manufacturing a hot cure-type urethane foam. In the hot cure-type urethane foam, since the mold temperature suited to curing is as high as 100° C., it is further effective to promote curing by ultraviolet rays. Or it is also possible to cure only by ultraviolet rays.

Additional advantages and modifications will readily occur to those skilled in the art. Therefore, the invention in its broader aspects is not limited to the specific embodiments, and illustrated examples shown and described herein. Accordingly, various modifications may be made without departing from the spirit or scope of the general inventive concept as defined by the appended claims and their equivalents.

What is claimed is:

1. A manufacturing method for producing urethane foam molded products, comprising:
   (i) applying a releasing agent on the inner surface of a mold, said agent consisting essentially of:
      (a) a first organopolysiloxane of which 0.1 to 5.0% of all organic groups bonded with Si atoms are vinyl groups, and at least 80% of the remaining organic groups are methyl groups, the first organopolysiloxane (a) being a dimethylorganopolysiloxane with a degree of polymerization of 150 and having a viscosity of 400 cs at 25° C. with both ends terminated with dimethylvinylsiloxy groups;
      (b) a second organopolysiloxane containing at least three Si bonded hydrogen atoms in one molecule, in which the first and second organopolysiloxanes have Si vinyl groups and SiH groups contained in a ratio of 1:0.5 to 1:5, and do not substantially contain unreactive siloxane, the second organopolysiloxane being in an amount of 0.3 to 10 parts by weight per 100 parts by weight of the first organopolysiloxane, the second organopolysiloxane (b) being a methylpolysiloxane with a polymerization degree of 40 and a viscosity of 25 cs at 25° C. with both ends terminated with trimethylsiloxy groups;
      (c) a catalytically effective amount of a reaction catalyst for the Si vinyl group and for the SiH group, said reaction catalyst being a complex of a platinum compound and vinyl siloxane, optionally in a solvent, and
      (d) a reaction regulator for inhibiting gel formation, said reaction regulator being selected from the group consisting of 2-methyl-3-butyn-2-ol, 3,5-dimethyl-1-hexyn-3-ol and 1-ethynyl-1-cyclohexanol and
      (e) optionally a lanthanum rare earth compound;
   (ii) irradiating the agent with ultraviolet rays of 250 to 400 nm to cure the agent;
   (iii) injecting a raw liquid of urethane foam inside the mold and foaming;
   (iv) curing the urethane foam inside the mold; and
   (v) removing the cured urethane foam molded product from the mold.

2. The manufacturing method of claim 1, which further comprises introducing a benzophenone compound as a sensitizer for promoting curing of the agent by irradiation with ultraviolet rays.

3. The manufacturing method of claim 1, wherein a plurality of urethane foam molded products are manufactured by repeating a plurality of times a urethane foam molding cycle comprising said step (iii) of injecting a raw liquid of urethane foam, said step (iv) of curing the urethane foam and said step (v) of removing the cured urethane foam molded product from the mold, by carrying out said step (i) of applying a releasing agent and said step (ii) of irradiating the agent with ultraviolet rays again after repeating said urethane foam molding cycle a plurality of times.

4. The manufacturing method of claim 1, wherein the urethane foam raw liquid in said step (iii) of injecting a raw liquid of urethane foam is of a cold cure-type having a cure temperature of about 60° C., and the temperature of the mold is maintained at about 60° C. in a series of steps, from the step (i) of applying a releasing agent until the step (v) of removing the cured urethane foam molded product from the mold.

5. The manufacturing method of claim 1, wherein the mold is heated to a temperature effective for promoting curing of the agent, and after curing the agent, the mold is cooled to a temperature capable of curing the urethane foam.

6. The manufacturing method of claim 1, wherein the second organopolysiloxane (b) is in an amount of 0.5 to 5 parts by weight.

7. The manufacturing method of claim 6, wherein the reaction catalyst contains 5 to 1000 ppm by weight of a platinum compound selected from the group consisting of platinum (I) chloride acid and platinum (II) chloride acid, said platinum compound being in a solvent selected from the group consisting of toluene, xylene, trichloroethylene, naphtha and a mixture thereof.

8. The manufacturing method of claim 6, wherein the agent contains at least one lanthanum rare earth compound selected from the group consisting of serium oxide, neodymium oxide and samarium oxide.

9. The manufacturing method of claim 6, wherein the curing is carried out at a temperature in the mold of 55° to 65° C.

10. The manufacturing method of claim 1, which further comprises introducing a sensitizer for promoting curing of the agent, said sensitizer being selected from the group consisting of benzophenone compounds, anthrone compounds and beryllium salts.

11. The manufacturing of claim 1, wherein the reaction catalyst contains 5 to 1000 ppm by weight of a platinum compound selected from the group consisting of platinum (I) chloride acid and platinum (II) chloride acid, said catalyst being in a solvent selected from the group consisting of toluene, xylene, trichloroethylene, naphtha and a mixture thereof; and the curing being carried out at a temperature in the mold of 55° to 65° C.

12. The manufacturing method of claim 11, which further comprises introducing a sensitizer for promoting the curing of the agent, said sensitizer being selected from the group consisting of benzophenone compounds, anthrone compounds and beryllium salts, and the agent contains at least one lanthanum rare earth compound selected from the group consisting of serium oxide, neodymium oxide and samarium oxide.

13. The manufacturing method of claim 12, wherein the reaction regulator is 1-ethynyl-1-cyclohexanol; the lanthanum rare earth metal compound is serium oxide; and the sensitizer is 4,4'-dimethoxybenzophenone.

* * * * *